United States Patent
Jasper et al.

(10) Patent No.: US 10,721,223 B2
(45) Date of Patent: Jul. 21, 2020

(54) METHOD AND APPARATUS FOR SECURE DEVICE PROVISIONING IN AN INDUSTRIAL CONTROL SYSTEM

(71) Applicant: Rockwell Automation Technologies, Inc., Mayfield Heights, OH (US)

(72) Inventors: Taryl J. Jasper, South Euclid, OH (US); Dukki Chung, Highland Heights, OH (US); Jack M. Visoky, Willoughby, OH (US); Michael A. Bush, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 322 days.

(21) Appl. No.: 15/951,464

(22) Filed: Apr. 12, 2018

(65) Prior Publication Data

US 2019/0319943 A1    Oct. 17, 2019

(51) Int. Cl.
| | |
|---|---|
| *G06F 7/04* | (2006.01) |
| *H04L 29/06* | (2006.01) |
| *G05B 15/02* | (2006.01) |
| *H04W 12/06* | (2009.01) |
| *G06F 15/16* | (2006.01) |

(52) U.S. Cl.
CPC .......... *H04L 63/0823* (2013.01); *G05B 15/02* (2013.01); *H04W 12/06* (2013.01)

(58) Field of Classification Search
CPC ..... G05B 15/02; H04L 63/0823; H04W 12/06
USPC .......................................................... 726/6
See application file for complete search history.

(56) References Cited

U.S. PATENT DOCUMENTS

| | | | |
|---|---|---|---|
| 6,167,464 | A | 12/2000 | Kretschmann |
| 8,014,720 | B2 | 9/2011 | Lortz |
| 8,806,209 | B2 | 8/2014 | Hemphill et al. |
| 8,989,767 | B2 | 3/2015 | Walker |
| 9,124,999 | B2 | 9/2015 | Junk |
| 9,246,757 | B2 | 1/2016 | Balog et al. |
| 9,331,896 | B2 | 5/2016 | Terwilliger et al. |
| 9,344,154 | B2 | 5/2016 | Wendling et al. |

(Continued)

FOREIGN PATENT DOCUMENTS

| | | |
|---|---|---|
| EP | 2493233 A1 | 8/2012 |
| EP | 2854358 A1 | 4/2015 |

(Continued)

*Primary Examiner* — Gary S Gracia
(74) *Attorney, Agent, or Firm* — Boyle Fredrickson, SC

(57) ABSTRACT

A secure method for establishing communications to provision modules in an industrial control system generates a certificate signing request to obtain a signed security certificate. A mobile device is located proximate to the module with the certificate signing request, and the mobile device has previously established itself as a secure communication interface on the network. The mobile device establishes a first connection between the module and the mobile device via a short-range protocol and a s second connection between the mobile device and a signing server via a network. The mobile device retrieves the certificate signing request via the first connection and transmits the certificate signing request to the signing server via the second connection. Because the mobile device has previously established itself as a secure interface, the transmission of the certificate signing request to the signing server may be made via a secure connection.

14 Claims, 5 Drawing Sheets

(56) References Cited

U.S. PATENT DOCUMENTS

| | | |
|---|---|---|
| 9,437,060 B2 | 7/2016 | Jackson et al. |
| 9,411,723 B2 | 8/2016 | Meftah et al. |
| 9,489,832 B2 | 11/2016 | Nair et al. |
| 9,497,576 B2 | 11/2016 | Jin et al. |
| 9,523,971 B2 | 12/2016 | Durbhaka et al. |
| 9,541,905 B2 | 1/2017 | Nixon et al. |
| 9,578,567 B1* | 2/2017 | Laganier ............ H04L 41/0668 |
| 9,592,964 B2 | 3/2017 | Gollu |
| 2004/0222300 A1 | 11/2004 | Strickland |
| 2006/0075477 A1* | 4/2006 | Shenoy ................ G06F 21/335 726/7 |
| 2006/0136902 A1 | 6/2006 | Monroe et al. |
| 2007/0015463 A1 | 1/2007 | Abel et al. |
| 2008/0102754 A1 | 5/2008 | Heinemann |
| 2009/0027189 A1 | 1/2009 | Isaksson et al. |
| 2009/0170432 A1* | 7/2009 | Lortz ................ H04L 41/0869 455/41.1 |
| 2009/0206984 A1 | 8/2009 | Charrat et al. |
| 2009/0279673 A1 | 11/2009 | Maffre et al. |
| 2011/0294500 A1* | 12/2011 | Chang ............... H04W 52/0229 455/426.1 |
| 2013/0095790 A1 | 4/2013 | Park et al. |
| 2013/0159195 A1* | 6/2013 | Kirillin ................ G06Q 20/322 705/71 |
| 2014/0327522 A1 | 11/2014 | Birgel et al. |
| 2014/0375421 A1 | 12/2014 | Morrison et al. |
| 2015/0033189 A1 | 1/2015 | Caceres et al. |
| 2015/0113180 A1 | 4/2015 | Baret et al. |
| 2015/0195011 A1 | 7/2015 | Birgel et al. |
| 2015/0207544 A1 | 7/2015 | Lim |
| 2015/0263790 A1 | 9/2015 | Chein |
| 2016/0147211 A1 | 5/2016 | Kore et al. |
| 2016/0192116 A1 | 6/2016 | Chiche et al. |
| 2016/0309285 A1 | 10/2016 | Charles |
| 2016/0371060 A1 | 12/2016 | Goja et al. |
| 2017/0061717 A1 | 3/2017 | Ouyang et al. |
| 2017/0093880 A1 | 3/2017 | Goutay et al. |
| 2017/0104511 A1 | 4/2017 | Roehrle et al. |
| 2017/0181047 A1* | 6/2017 | Cai ...................... H04W 36/03 |
| 2017/0188262 A1 | 6/2017 | Roehrle et al. |
| 2017/0195827 A1 | 7/2017 | Vasko et al. |
| 2017/0205793 A1 | 7/2017 | Henkel et al. |
| 2017/0310660 A1* | 10/2017 | Newton .............. H04L 63/0281 |
| 2018/0007033 A1* | 1/2018 | Ajitomi ............... H04L 63/0823 |

FOREIGN PATENT DOCUMENTS

| | | |
|---|---|---|
| EP | 3082060 A1 | 10/2016 |
| EP | 3098766 A1 | 11/2016 |
| EP | 3128382 A1 | 2/2017 |
| WO | 2009/044228 A2 | 4/2009 |
| WO | 2012/159673 A1 | 11/2012 |
| WO | 2014/099154 A1 | 6/2014 |
| WO | 2014/140771 A1 | 9/2014 |
| WO | 2015/047224 A1 | 2/2015 |
| WO | 2015/048811 A2 | 4/2015 |
| WO | 2015/156453 A1 | 10/2015 |
| WO | 2015/158453 A1 | 10/2015 |
| WO | 2015/189702 A2 | 12/2015 |
| WO | 2016/037711 A1 | 3/2016 |
| WO | 2016/081684 A1 | 5/2016 |
| WO | 2016/107981 A1 | 7/2016 |
| WO | 2016/148773 A1 | 9/2016 |
| WO | 2016/193227 A1 | 12/2016 |

* cited by examiner

METHOD AND APPARATUS FOR SECURE DEVICE PROVISIONING IN AN INDUSTRIAL CONTROL SYSTEM

BACKGROUND INFORMATION

The subject matter disclosed herein relates to generally to a system and method for providing secure provisioning of modules in an industrial control system and, more specifically, to a system for providing a signed certificate to a module for connecting to a network to securely configure the module.

An industrial control system typically includes at least one industrial controller configured to execute a control program and multiple modules distributed about the controlled machine or process. Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist extreme environmental conditions than conventional computers. The processors and operating systems are optimized for real-time control and are programmed with languages designed to permit rapid development of control programs tailored to a constantly varying set of machine control or process control applications.

Generally, the industrial control systems have a highly modular architecture, for example, that allows different numbers and types of input and output modules to be used to connect the industrial controller to the process or machinery to be controlled. This modularity may be further facilitated through the use of intelligent, or configurable, modules, where the module may include, for example, slots for daughter boards, configurable parameters, or different types or numbers of terminals. Including different combinations of daughter boards, parameter settings, terminals and the like may allow a single module to operate in a number of different configurations according to the application requirements.

During commissioning, a module is mounted to the controlled process or machine and must be configured based on the options selected and/or installed on the module and based on the application requirements. This configuration typically requires technician interaction and may require, for example, moving jumpers within the module, adjusting dials or positioning switches. The interaction may further require a technician to interact with a user interface on the module to set parameters for the module according to the desired operation. This technician interaction, however, is time consuming and prone to error. A technician must often locate or download a copy of a user manual for the device to determine the proper settings. Further, the technician may inadvertently place one of the dials, switches, or jumpers in an incorrect position resulting in undesired operation of the module. Thus, there is a need for an improved method for commissioning modules in an industrial control system.

Industrial controllers are increasingly being connected to a network external to the controlled process or machine, whether the network is internal to the facility at which the process or machine is installed, such as an intranet, or external to the facility, such as the Internet. The industrial controller may be connected to the network via a network interface integrated in a processor module or via a separate network module. Additional modules in the industrial control system may, in turn, connect to the external network by a backplane if the modules are mounted within a rack or by an industrial network if the modules are mounted remotely from each other.

In order to reduce time and the potential for error during commissioning, a technician may connect to the industrial control system and to individual modules via the external network. Configuration software executing on a computer connected to the network may identify the modules in the industrial control system and further identify hardware options installed in each module. The module may be configured to receive electronic settings, that is parameter settings, identifying the configuration of the module rather than requiring a technician to manually set dials, switches, or jumpers. The configuration software may also provide a graphical interface to facilitate configuration and setting of other parameters to determine the desired operation of the module.

However, during this initial configuration via the network, a module is most vulnerable to interference, whether intentional or unintentional, over the network. The module may not be known to the configuration software on power up and may require auto-detection routines to identify the module. While the first step in the detection process may be to generate and validate security certificates for each module, this initial detection and security certificate generation process is executed without secure connections. Thus, it would be desirable to provide a secure method for establishing communications to provision modules in the industrial control system.

BRIEF DESCRIPTION

The subject matter disclosed herein describes a secure method for establishing communications to provision modules in an industrial control system. At power-up, a module executes a routine to detect the presence of a signed security certificate on the module. The signed security certificate is not present initially or may be lost, for example, during an upgrade of firmware or other reconfiguration of the module. If the signed security certificate is absent, the module generates a certificate signing request to obtain a signed security certificate. A mobile device that is configured to communicate via both a short-range protocol, such as near-field communications or Bluetooth® protocols, as well as via a long-range protocol, such as IEEE 802.11 protocols, is located proximate to the module with the certificate signing request. The mobile device has previously established itself as a known device and provides a secure communication interface on the network. The mobile device is positioned proximate to the mobile device such that it is within range of the short-range protocol and establishes a first connection between the module with the certificate signing request and the mobile device. The mobile device is also in communication with a signing server via the long-range protocol. The signing server may be located remotely from the industrial control system and may be connected via the Internet, the intranet, or a combination thereof. A wireless access point located within the range of the long-range protocol allows the mobile device to access the network and establish a second connection between the signing server and the mobile device. The mobile device retrieves the certificate signing request via the first connection using the short-range protocol and transmits the certificate signing request to the signing server via the second connection using the long-range protocol and the network. Because the mobile device has previously established itself as a secure interface, the transmission of the certificate signing request to the signing server may be made via a secure connection. The mobile device similarly receives the signed certificate back from the signing server via a secure connection via the second connection on the long-range protocol and the network. Finally, the mobile device transmits the signed certificate to the module via the first connection, such that the mobile device itself may subsequently use the signed certificate to securely communicate via the industrial network, the intranet, the Internet, or combination thereof.

According to one embodiment of the invention, a method for provisioning a module in an industrial control system is disclosed. A secure device is positioned a first distance from the module in the industrial control system, where the secure device is a mobile device operative to be located at a plurality of positions. A first wireless communication connection is established between the secure device and the module via a first wireless communication protocol, where the first wireless communication protocol is operative over the first distance. A second wireless communication connection is established between the secure device and a signing server via a wireless access point and a second wireless communication protocol. The wireless access point is a second distance from the secure device, and the second wireless communication protocol is different than the first wireless communication protocol. A certificate signing request is received at the secure device from the module via the first wireless communication connection and transmitted from the secure device to the signing server via the second wireless communication connection. A signed certificate is received at the secure device from the signing server via the second wireless communication connection and transmitted from the secure device to the module via the first wireless communication connection.

According to another embodiment of the invention, a device for provisioning a module in an industrial control system is disclosed. The device includes a first and a second communication interface, a user interface, and a processor. The first communication interface is operative to establish a first wireless communication connection between the device and the module in the industrial control system via a first wireless communication protocol. The second communication interface is operative to establish a second wireless communication connection between the device and a signing server via a wireless access point and a second wireless communication protocol, where the second wireless communication protocol is different than the first wireless communication protocol. The user interface is operative to receive an input to initiate provisioning the module, and the processor is operative to receive a certificate signing request from the module via the first wireless communication connection responsive to the input, transmit the certificate signing request to the signing server via the second wireless communication connection, receive a signed certificate from the signing server via the second wireless communication connection, and transmit the signed certificate to the module via the first wireless communication connection.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
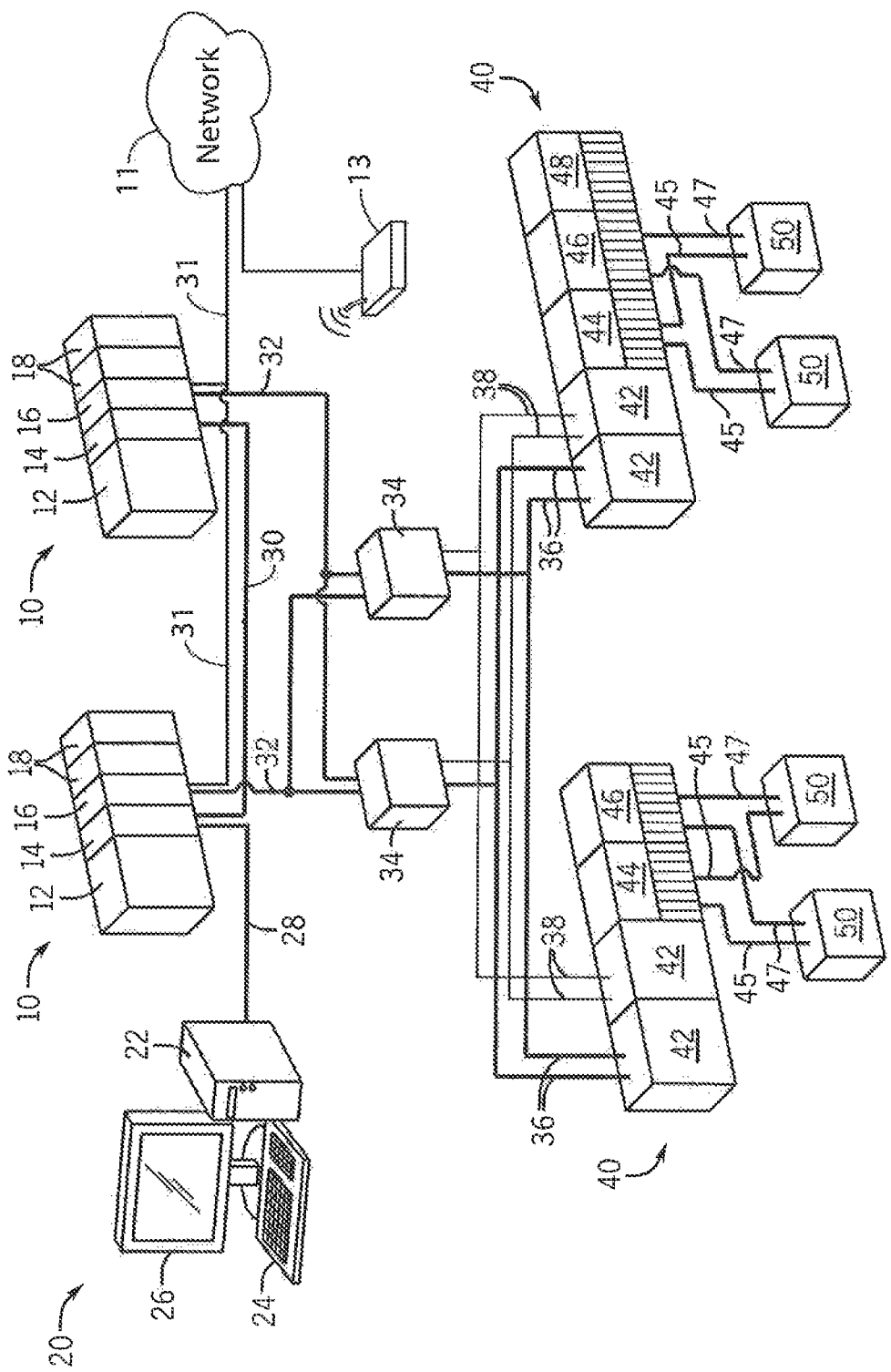
FIG. 1 is a is a schematic representation of an exemplary industrial control system incorporating modules which may be provisioned according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary industrial control system is illustrated. The industrial control system includes a pair of industrial controllers 10. As illustrated, each industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16. Each industrial controller 10 is further shown with two additional modules 18 that may be selected according to the application requirements and may be, for example, analog or digital input or output modules.

One or more operator interfaces 20 may be connected to the industrial control system. Each operator interface 20 may include a processing device 22, input device 24, including, but not limited to, a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, ControlNet. Each network module 16 and switch 34 is configured to communicate according to the protocol of the network to which it is connected and may be further configured to translate messages between two different network protocols.

Each network interface module 16 is also connected to an external network 11 via an appropriate network cable 31. It is contemplated that the network 11 may be the Internet, an intranet, or a combination thereof. Although devices are illustrated as being connected via a wired connection, one or more wireless access points 13 may be included to allow a device to connect wirelessly to the network 11. Each wireless access point 13 may be positioned at different locations within the building in which the controller machine or process is located and spaced apart such that devices within the building may connect to one of the wireless access points 13 from any position within the building. A mobile device may selectively connect to the wireless access point 13 located closed to the mobile device as it moves through the building. Each wireless access point 13 is connected to the network 11 via a wired or via an additional wireless connection. It is contemplated that the connection to the network 11 may be, for example, a standard Ethernet connection.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
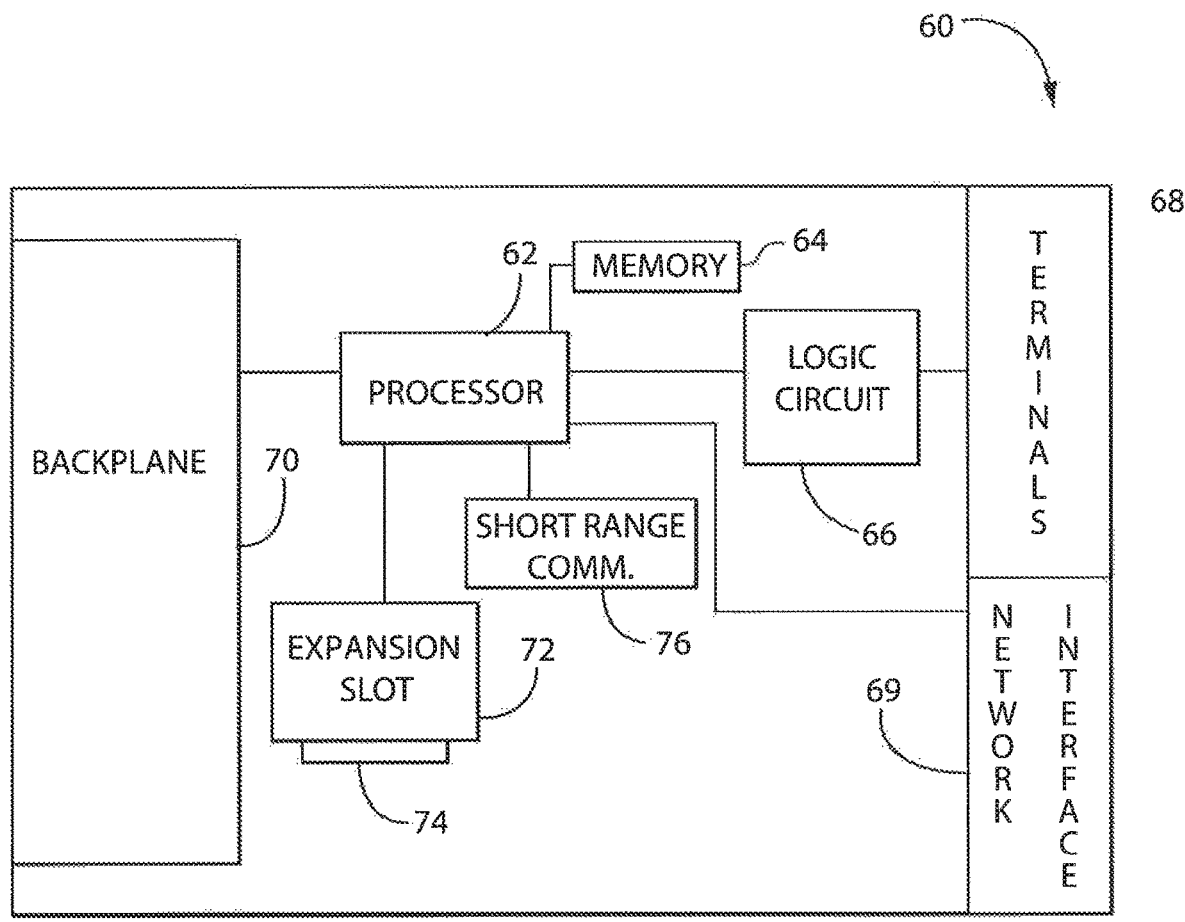
FIG. 2 is a partial block diagram representation of an exemplary module from the industrial control system of FIG. 1.

Turning next to FIG. 2, an exemplary module 60 from the industrial control network of FIG. 1 is illustrated. The exemplary module 60 is not intended to be limiting and may be, for example, an input or output module connected in a rack from one of the industrial controllers 10 or in one of the remote racks 40. Optionally, the exemplary module 60 may be a special function module such as a processor module 14 or network interface module 16. According to still other embodiments, the exemplary module 60 may perform other functions. The exemplary module 60 is intended to illustrate components that may be present in any of the modules configured to receive secure provisioning via the method disclosed herein, wherein the secure provisioning may include, for example, firmware, parameter configuration, calibration, or a combination thereof.

The exemplary module 60 includes a processor 62 and a memory device 64. The processor 62 is configured to execute instructions and to access or store operating data and/or configuration parameters stored in the memory device 64. The processor 62 may be any suitable processor according to the node requirements. It is contemplated that the processor 62 may include a single processing device or multiple processing devices executing in parallel and may be implemented in separate electronic devices or incorporated on a single electronic device, such as a field programmable gate array (FPGA) or application specific integrated circuit (ASIC). Similarly, the memory device 64 may be a single device, multiple devices or may be incorporated in part or in whole within the FPGA or ASIC. The memory device 64 may include volatile memory, non-volatile memory, or a combination thereof. The module 60 may be configured to communicate with other modules mounted in the same rack or contained within a single housing via a backplane and a corresponding backplane connector 70. Optionally, the module may communicate with other modules via a network interface 69 and associated network media according to a corresponding network protocol. The module 60 includes terminals 68 configured to be connected to external devices to receive input signals, transmit output signals, or a combination thereof. An additional logic circuit 66 may be included between the processor 62 and the terminals 68 to convert the input and output signals between the proper signals for communication with external devices and the proper signals for communication with the processor 62. It is contemplated that the logic circuit 66 may be implanted via separate electronic devices, incorporated into a single device, such as a FPGA or ASIC, or a combination thereof. The exemplary module 60 also includes an expansion slot 72. The expansion slot 72 may be configured to receive an option card 74 to provide specific functionality for the module. For example, the option card 74 may be a network protocol card, where each network protocol card allows the module 60 to communicate according to a different network protocol. Each module 60 further includes a short-range communication interface 76 as will be discussed in more detail below. It is contemplated that the short-range communication interface 76 may be, but is not limited to, a near-field communication (NFC) interface or a Bluetooth® interface.

Figure 3:
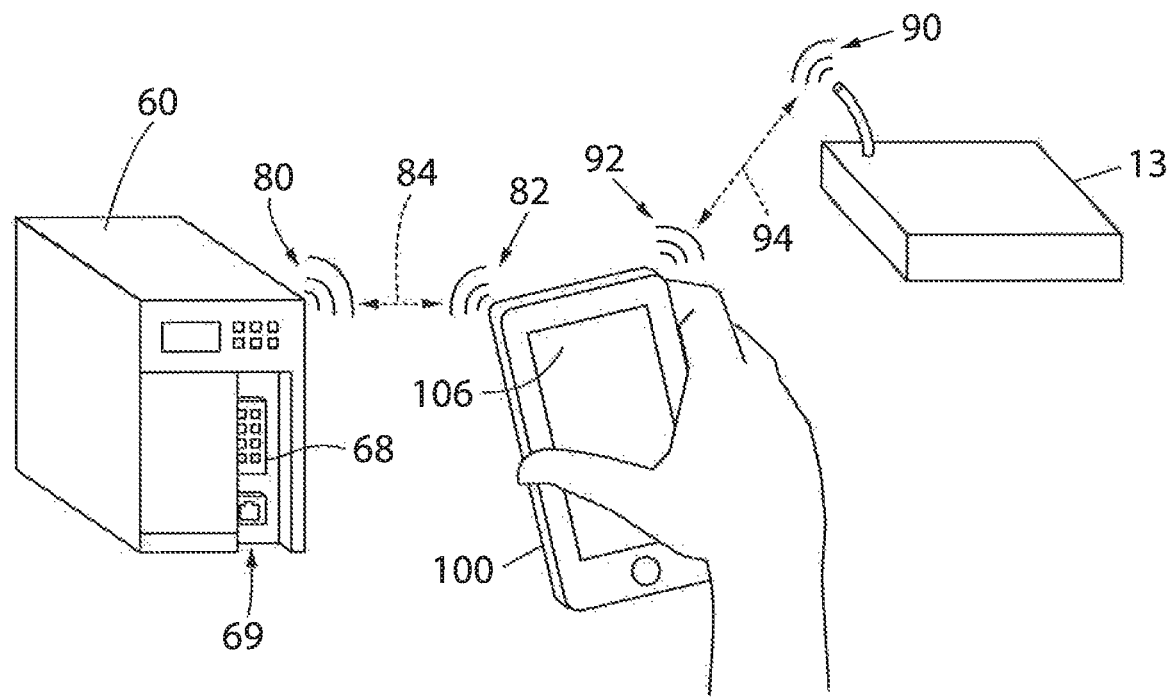
FIG. 3 is a perspective view of an exemplary mobile device performing secure provisioning according to one embodiment of the invention.

During initial configuration of or after modifications have been made to the industrial control system, one or more of the modules 60 may require provisioning. Provisioning may include performing an initial configuration of the module, for example, to identify option cards present in the module or establish desired operation of the module. Provisioning may further require updating firmware on the module or setting parameters corresponding to inputs or outputs connected to the module. To facilitate provisioning of the modules 60 a mobile device 100, which is configured to perform the provisioning, may be provided to a technician, as shown in FIG. 3. Optionally, an existing mobile device 100 available to the technician may be configured, for example, by loading an application to perform the provisioning. It is contemplated that the mobile device 100 may be, but is not limited to, a mobile phone, a tablet computer, a notebook computer, a laptop computer, or any other suitable mobile computing device and may be a general purpose mobile computing device with a proprietary application installed to communicate with the modules 60 or may be a proprietary mobile computing device dedicated to provisioning modules.

In operation, the mobile device 100, also referred to herein as a secure device, provides a secure connection for a module 60 that may just be powered up or otherwise does not have a security certificate by which the module 60 can establish its own secure connection to the network 11. During an initial power-up of the module 60 or during an initial connection to the network 11, the module 60 needs to identify itself to the network 11. Without the mobile device 100 present, the module 60 would need to connect directly to the network 11. However, as discussed above, the initial establishment of a connection requires an initial request for connection via an unsecure communication over a potentially unsecure network 11. Establishing the secure connection presents an opportunity for undesired access to the industrial control system via the network.

In contrast, providing the mobile device 100 eliminates the initial unsecure connection via the network 11. The mobile device 100 is itself established as a secure device prior to utilization in the provisioning process. The mobile device 100 may be established as a secure device by obtaining its own signed security certificate, by requiring an operator to log in to the mobile device 100 via a stored credential, such as a user name and password or a biometric identifier, or a combination thereof. Once the mobile device 100 is established as a secure device it communicates with the modules 60 to establish a secure connection for each module 60 to the network 11.

Figure 4:
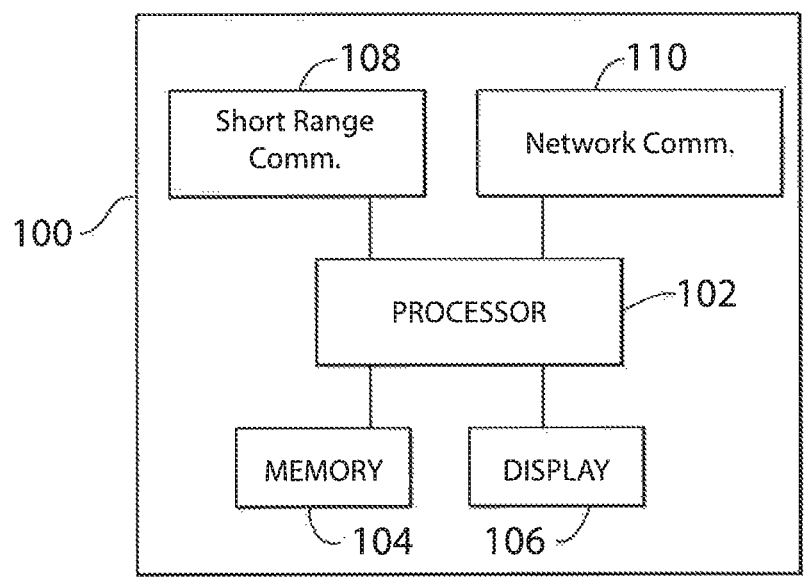
FIG. 4 is a partial block diagram representation of the exemplary mobile device of FIG. 3.

Turning next to FIG. 4, the secure device 100 includes a processor 102 and a memory device 104 in communication with the processor 102. The processor 102 may be any suitable processor according to the requirements of the secure device 100 and may include a single processing device or multiple processing devices, executing synchronously or asynchronously, executing in parallel or separately, or any combination thereof. The memory device 104 may be a single device or multiple devices and include transitory memory, non-transitory memory, or a combination thereof. The secure device 100 may include a user interface to receive input from and provide output to a user of the device. According to the illustrated embodiment, the secure device 100 includes a touchscreen display 106 that may both receive input from and provide output to the user.

The secure device 100 also includes a first communication interface 108 and a second communication interface 110. The first communication interface 108 is illustrated as a short-range communication interface. According to one embodiment of the invention, the short-range communication interface 108 is a near-field communication (NFC) interface and requires that the secure device 100 be positioned within about four (4) centimeters of another NFC device to establish a connection. According to another embodiment of the invention, the short-range communication interface 108 is a Bluetooth® communication interface and requires that the secure device 100 be positioned within about thirty (30) feet of another Bluetooth®-enabled device to establish a connection. The second communication interface 110 is illustrated as a network communication interface. The network communication interface may be a wi-fi interface or an IEEE 802.11 interface, operative to establish a connection to a wireless access point 13. As is understood, the range for the second communication interface 110 may vary based on the selected IEEE 802.11 protocol and/or the frequency at which the interface is operating. However, an exemplary range is between one hundred fifty (150) and three hundred (300) feet. Thus, it is contemplated that the second communication interface 110 has a greater range than the first communication interface 108.

Figure 5:
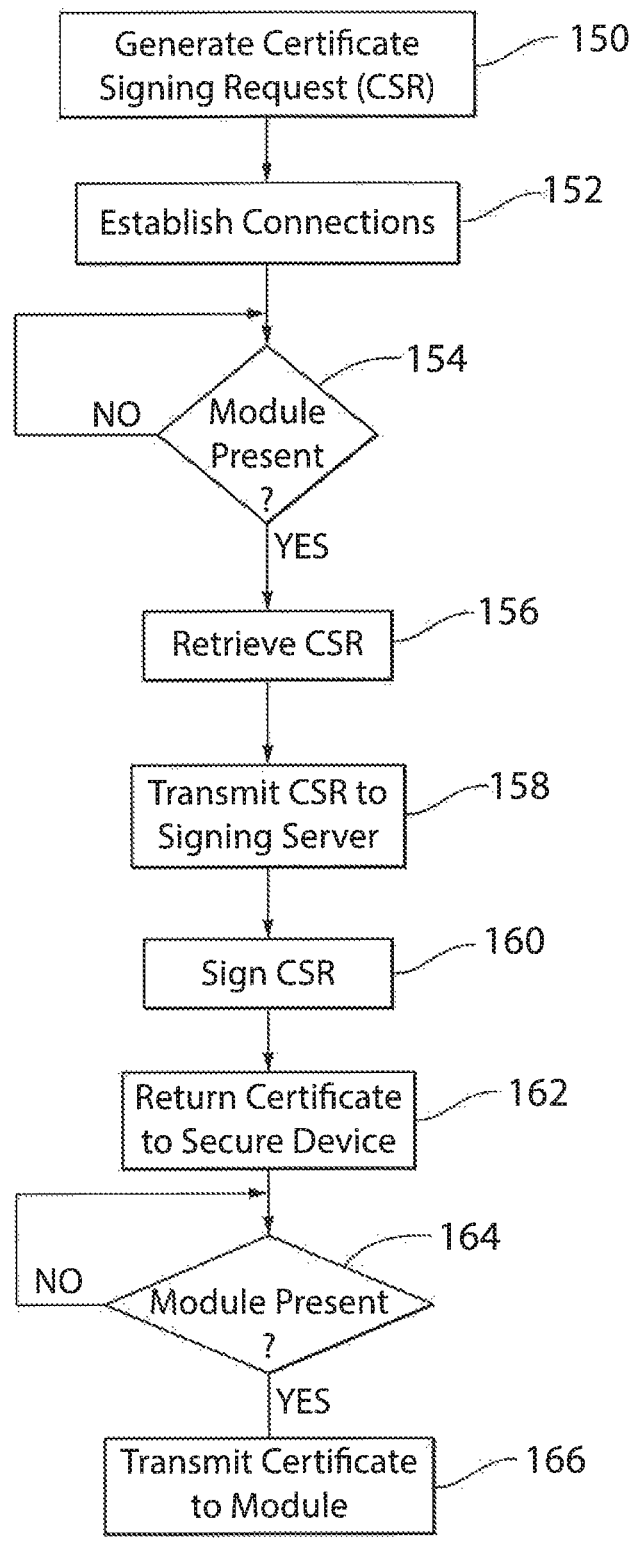
FIG. 5 is a flow diagram of the steps performed by the mobile device of FIG. 3 to perform secure provisioning of the mobile device according to one embodiment of the invention.

Turning then to FIG. 5, the steps taken, according to one embodiment of the invention, to establish an initial connection between a module 60 and a server to begin the secure provisioning of the module are illustrated. At step 150, the module 60 generates a certificate signing request (CSR). The mobile device 100 is positioned proximate to the module 60 to obtain the CSR.

Figure 6:
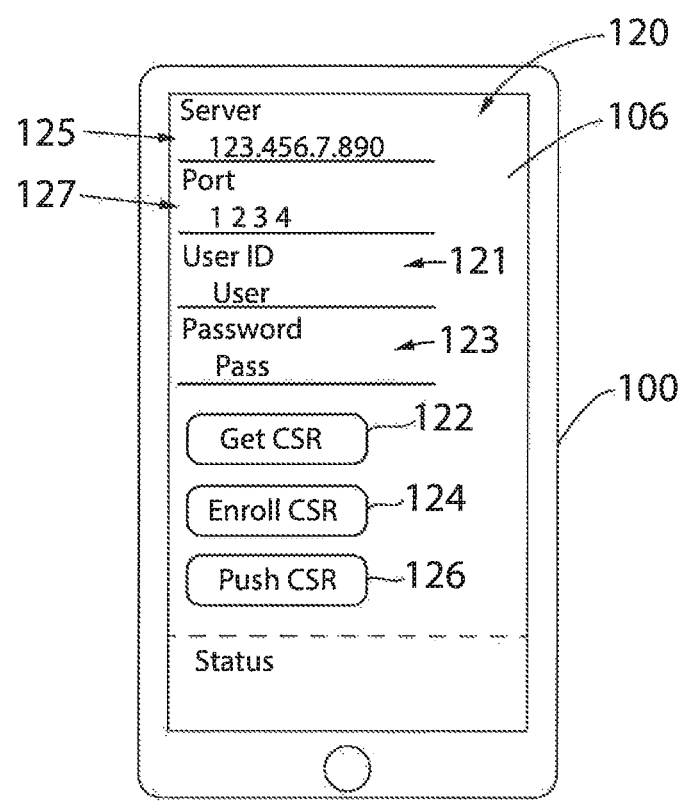
FIG. 6 is a front elevation view of the mobile device of FIG. 3 including an exemplary interface screen used to perform the secure provisioning.

An application executing on the mobile device 100 generates an interface screen 120 such as the exemplary screen shown in FIG. 6. The application may require a technician to enter login credentials, such as a user name 121 and password 123. Optionally, the mobile device 100 may include a biometric sensor, such as a fingerprint scanner, or other method of secure access by a technician. The mobile device 100 may also include a signed certificate such that it may establish a secure connection to the network 11. The mobile device 100 may also include an address 125 and port 127 for a signing server to which the mobile device 100 will connect. Upon establishing itself as a known device to the network 11, the mobile device 100 acts as a secure device for the module 60 to request its own signature.

With reference again to FIGS. 3 and 5, the secure device 100 establishes connections between the module 60 and the network 11, as shown in step 152. The secure device 100 is positioned proximate the module 60 and within the range of the short-range communication interface 108. If, for example, the short-range communication interface 108 is NFC, the secure device 100 may be positioned within about 4 centimeters of the module 60. Optionally, if the short-range communication interface 108 is Bluetooth®, the secure device 100 may be positioned within about 30 feet of the module 60. The module 60 includes a communication interface corresponding to short-range communication interface 108 in the secure device 100. Wireless transmissions 80, 82 from each of the module 60 and the secure device 100 establish a first wireless connection 84 between the module 60 and the secure device 100 according to the protocol being utilized. One or more wireless access points 13 are included in the industrial control system and may be positioned around the controlled machine or process at intervals to provide wi-fi coverage at each of the modules 60 to be provisioned. The network communication interface 110 is operative to generate wireless transmissions 92 according to the same protocol by which the wireless access point 13 generates wireless transmissions 90. The secure device establishes a second connection 94 between the secure device 100 and the wireless access point 13. The second connection 94 is also a secure connection, where the secure device 100 may utilize the previously signed certificate, user credentials, or the like to establish the secure connection with the wireless access point 13. Typically, the distance between the secure device 100 and the wireless access point 13 is greater than the distance between the module 60 and the secure device 100. As shown in step 154, the secure device 100 will wait until the connections are established and it can verify that a module 60 is present before continuing with secure provisioning.

At step 156, the secure device 100 will retrieve the CSR from the module 60. According to the exemplary interface screen 120 shown in FIG. 6, a Get CSR button 122 may be provided to initiate the retrieval. The CSR is transmitted between the module 60 and the secure device 100 via the first wireless communication connection 84. As discussed previously, this initial connection and transfer of the CSR from the module 60 to the secure device 100 may be performed via an unsecured connection. However, because the transmission is limited in range to the distance of the short-range communication and requires the presence of the secure device 100, the risk of undesired interference in the communications is minimized.

At step 158, the secure device 100 transmits the CSR to a signing server via the second wireless communication connection 94 and the network 11. According to the exemplary interface screen 120 shown in FIG. 6, an Enroll CSR button 124 may be provided to initiate the transmission to the signing server. The signing server signs a certificate as a function of the CSR as shown in step 160. The signed certificate is transmitted back from the signing server to the secure device 100 via the network 11 and the second wireless communication connection 94 as shown in step 162.

After receiving the signed certificate back from the signing server, the secure device 100 transmits the certificate to the module 60. As shown in step 164, the secure device 100 first checks that the module 60 is still present. Moving the secure device 100 away from the module or electromagnetic interference around the module 60 may cause the first wireless connection 84 to be lost. If the connection is lost, the secure device 100 will re-establish the connection 84 to transmit the certificate. When the secure device 100 verifies that the module 60 is still present, it transmits the certificate to the module 60, as shown in step 166. According to the exemplary interface screen 120 shown in FIG. 6, a Push CSR button 126 may be provided to initiate the transmission of the signed certificate to the module 60.

Upon receiving the signed certificate, the module 60 continues the provisioning. According to one embodiment, the module 60 may establish its own secure connection to the network 11 to obtain configuration parameters, settings or firmware according to the requirements of the module 60. According to another embodiment, the signing server may be a central server which further includes the configuration parameters, settings, or firmware required by the module 60 and the module 60 may obtain the required configuration parameters, settings, or firmware via the previously established first and second connections 84, 94.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for provisioning a module in an industrial control system, comprising the steps of:
    positioning a secure device a first distance from the module in the industrial control system, wherein the secure device is a mobile device operative to be located at a plurality of positions;
    establishing a first wireless communication connection between the secure device and the module via a first wireless communication protocol, wherein the first wireless communication protocol is operative over the first distance;
    establishing a second wireless communication connection between the secure device and a signing server via a wireless access point and a second wireless communication protocol, wherein the wireless access point is a second distance from the secure device and the second wireless communication protocol is different than the first wireless communication protocol;
    receiving a certificate signing request at the secure device from the module via the first wireless communication connection;
    transmitting the certificate signing request from the secure device to the signing server via the second wireless communication connection;
    receiving a signed certificate at the secure device from the signing server via the second wireless communication connection; and
    transmitting the signed certificate from the secure device to the module via the first wireless communication connection.

2. The method of claim 1 wherein the second distance is greater than the first distance.

3. The method of claim 2 wherein the first wireless communication connection is established via a near field communication protocol and wherein the first distance is less than four centimeters.

4. The method of claim 2 wherein the first wireless communication connection is established via a Bluetooth protocol and wherein the first distance is less than thirty feet.

5. The method of claim 2 wherein the second wireless communication connection is established via a wireless local area network protocol.

6. The method of claim 1 further comprising the initial steps of:
    obtaining a credential of an operator of the secure device; and
    storing the credential of the operator on a memory device for the secure device, wherein the secure device uses the credential when establishing the second wireless communication connection to establish a secure connection.

7. The method of claim 1 further comprising the initial steps of:
    obtaining a signed certificate for the secure device; and
    storing the signed certificate for the secure device on a memory device for the secure device, wherein the secure device uses the signed certificate when establishing the second wireless communication connection to establish a secure connection.

8. A device for provisioning a module in an industrial control system, the device comprising:

a first communication interface operative to establish a first wireless communication connection between the device and the module in the industrial control system via a first wireless communication protocol;

a second communication interface operative to establish a second wireless communication connection between the device and a signing server via a wireless access point and a second wireless communication protocol, wherein the second wireless communication protocol is different than the first wireless communication protocol;

a user interface operative to receive an input to initiate provisioning the module; and a processor operative to:
- receive a certificate signing request from the module via the first wireless communication connection responsive to the input;
- transmit the certificate signing request to the signing server via the second wireless communication connection;
- receive a signed certificate from the signing server via the second wireless communication connection; and
- transmit the signed certificate to the module via the first wireless communication connection.

9. The device of claim 8 further comprising a memory device in communication with the processor, wherein the memory device is operative to store a certificate for the device and wherein the second wireless communication connection is established as a secure connection using the certificate for the device.

10. The device of claim 8 further comprising a memory device in communication with the processor, wherein the memory device is operative to store a credential of an operator of the device and wherein the second wireless communication connection is established as a secure connection using the credential.

11. The device of claim 8 wherein:
- the device is a mobile device operative to be located at a plurality of positions,
- the device is positioned a first distance from the module when establishing the first wireless communication connection,
- the device is positioned a second distance from the wireless access point when establishing the second wireless communication connection, and
- the second distance is greater than the first distance.

12. The device of claim 11 wherein the first wireless communication connection is established via a near field communication protocol and wherein the first distance is less than four centimeters.

13. The device of claim 11 wherein the first wireless communication connection is established via a Bluetooth protocol and wherein the first distance is less than thirty feet.

14. The device of claim 11 wherein the second wireless communication connection is established via a wireless local area network protocol.

* * * * *